United States Patent [19]

Shimizu

[11] 4,436,387

[45] Mar. 13, 1984

[54] LENS GROUP SHIFTING MECHANISM FOR ZOOM BINOCULARS

[75] Inventor: Fumio Shimizu, Minowa, Japan

[73] Assignee: Light Koki Co., Ltd., Nagano, Japan

[21] Appl. No.: 334,178

[22] Filed: Dec. 24, 1981

[30] Foreign Application Priority Data

Dec. 26, 1980 [JP] Japan ................. 55-183856

[51] Int. Cl.³ ................................. G02B 7/06
[52] U.S. Cl. ..................... 350/556; 350/429
[58] Field of Search ................. 350/518–519, 350/521–522, 530, 548, 552, 554–556, 559–560, 570, 563–565, 255, 429–430

[56] References Cited

U.S. PATENT DOCUMENTS

| | | | |
|---|---|---|---|
| 1,178,478 | 4/1916 | Becker | 350/255 |
| 1,952,224 | 3/1934 | Trautmann et al. | 350/556 |
| 4,087,153 | 5/1978 | Hengst | 350/554 |

FOREIGN PATENT DOCUMENTS 1465229 11/1966 France ................. 350/429

Primary Examiner—William H. Punter
Attorney, Agent, or Firm—Armstrong, Nikaido, Marmelstein & Kubovcik

[57] ABSTRACT

A mechanism for longitudinally shifting a shiftable lens group in a zoom lens system, including a lever pivotally mounted in a frame having a rotatable pin on each end thereof, a terminal member mounted on the movable lens group having a groove therein extending perpendicular to the longitudinal axis of the lens system with one of the pins riding in the groove, a shift bar mounted in the frame movable only in parallel with the axis having a groove in one end thereof extending perpendicular to the axis with the other pin of the lever riding in the groove, and a rotatable mechanism in the frame for moving the shift bar longitudinally so that, upon such movement, the engagement of the pin in the groove of the bar pivots the levers so that the engagement of the other pin in the groove of the terminal member shifts the lens group longitudinally.

3 Claims, 3 Drawing Figures

LENS GROUP SHIFTING MECHANISM FOR ZOOM BINOCULARS

BACKGROUND OF THE INVENTION

The present invention relates to a lens group shifting mechanism for zoom binoculars and, more specifically, an encased shifting mechanism for shifting the movable lens group of zoom binoculars having a minimum portion to be water-tightly sealed.

Conventional zoom binoculars are known, including ocular lens elements, objective lens elements, prism members and a shiftable zoom lens group, all within an outer cylinder. Various mechanisms are known for longitudinally moving the shiftable lens group along the longitudinal axis of the cylinder. However, the known shifting mechanism is generally movable longitudinally from the outside of the outer cylinder. This is a disadvantage when the zoom binoculars are desired to be water-tightly sealed. The various gaps and surfaces which result are very difficult, if not impossible, to water-tightly seal.

THE OBJECTS AND SUMMARY OF THE INVENTION

It is an object of the present invention to provide a shifting mechanism for the shiftable lens group of zoom binoculars which is capable of easily being water-tightly sealed.

It is another object of the present invention to provide a shifting mechanism which is simple to construct and easy to operate.

It is yet another object of the present invention to provide a shifting mechanism for zoom binoculars which does not interfere with the normal, desired folding ot the two outer cylinders of the binoculars about a center portion.

It is a further object of the present invention to provide a shifting mechanism for the shiftable lens group of zoom binoculars which is independent of the focusing mechanism of the binoculars.

The above objects and other advantages which would be readily apparent to a person of ordinary skill in the art when viewing the following disclosure are obtained in a mechanism for longitudinally shifting a movable lens group in a zoom lens system which includes at least one outer cylinder having a longitudinal axis, and a frame connected to the cylinder. The mechanism can comprise a lever having opposite ends and being pivotally mounted in the frame between the ends, each end having a rotatable pin mounted thereon, a terminal member mounted on the movable lens group having a groove therein extending perpendicularly to the axis of the outer cylinder, one pin of one end of the lever riding in the groove; a shift bar mounted in the frame movably only in parallel with the axis and having opposite ends, one end of the bar having a groove therein extending perpendicularly to the axis, the other pin of the lever riding in the groove, and rotatable means in the frame for moving the shift bar longitudinally. Upon longitudinal movement of the shift bar, the engagement of the rotatable pin in the groove of the bar pivots the lever so that the engagement of the other pin in the groove of the terminal member shifts the lens group longitudinally.

The rotatable means can comprise a shaft rotatably mounted in the frame having screw thread thereon, a knob projecting from the frame engaged with one end of the shaft, and screw-thread means associated with the shaft and the shift bar for translating rotation of the knob into longitudinal movement of the shift bar.

Preferably, the entire mechanism except for a portion of the rotatable means, is water-tightly encased within the frame and the outer cylinder. The portion of the rotatable means not encased is, preferably, the knob.

BRIEF DESCRIPTION OF THE DRAWINGS

The above and other objects and the attendant advantages of the present invention are readily apparent by reference to the following detailed description when considered in conjunction with the accompanying drawings wherein.

DETAILED DESCRIPTION OF THE PRESENT INVENTION

Figure 1:
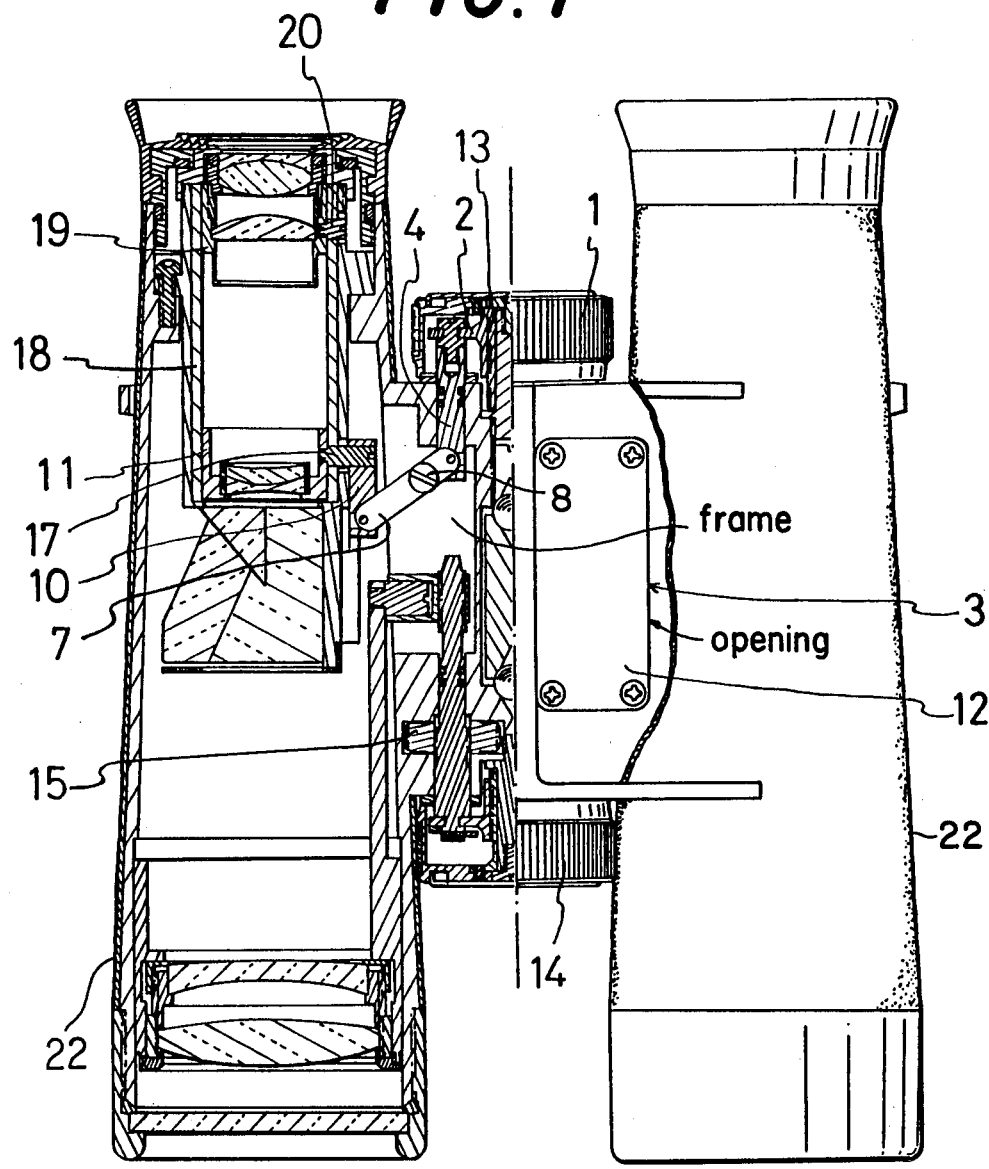
FIG. 1 is a partial cross-sectional, elevational view of zoom binoculars constructed with the shift mechanism of the present invention.
Figure 2:
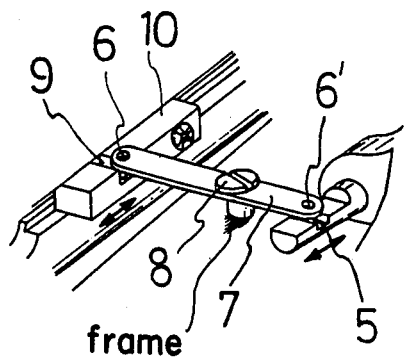
FIG. 2 is a partial, perspective, view of the most basic components of the shift mechanism.
Figure 3:
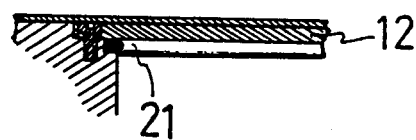
FIG. 3 is a partial, cross-sectional view of a cover encasing the mechanism into the frame and outer cylinder of the zoom binoculars.

The present invention is utilized in zoom binoculars, which generally comprise a pair of outer cylinders 22 aligned in parallel, each outer cylinder having a longitudinal axis. These cylinders are joined by a frame which is foldable about an axis parallel with the longitudinal axes of the cylinders. Each cylinder has therein ocular elements, objective lens elements, prism elements and a shiftable lens group providing the zoom feature. A shift mechanism for the shiftable lens group is provided.

A terminal member 10 is provided as a part of the body tube 11 carrying the shiftable lens group. When the terminal element 10 is moved along the longitudinal axis of the cylinder, the lens group for zooming is moved, thus changing the magnifying power of the binoculars. A groove is provided on the terminal 10 which extends in a direction perpendicular to the longitudinal axis.

A lever 7 is pivotally mounted in the frame on a fulcrum screw 8. Pins 6, 6' are mounted on the opposite ends of the lever 7. The pins are rotatable. One pin 6 is mounted in the groove 9 of the terminal member 10 for slidable motion therein.

A shift bar 4 is fitted in the frame so as to be capable of only movement in parallel with the longitudinal axis. The shift bar has a groove 5 formed in one end thereof which extends perpendicular to the longitudinal axis. The other pin 6' of the end of the lever 7 is fitted slidably and rotatably in the groove 5. The opposite end of the shift bar 4 is fixed integrally with a shift plate 2, which is screw-threadingly engaged with a shaft 13. Shaft 13 is mounted for only rotation in the frame. A knob 1 is mounted on the shaft 13.

A knob 14 and associated mechanism is provided for focusing. A knob 15 is provided for adjusting visibility.

When the knob 1 for zooming is turned, the shaft 13 only rotates. By the screw-thread engagement, the shift bar 4 moves longitudinally. As the shift bar moves longitudinally, the pin 6 moves in a direction in the groove 5 perpendicular to the longitudinal axis, thereby pivoting the lever 7 around the fulcrum screw 8. This moves the pin 6' in direction perpendicular to the longitudinal axis. Since the terminal member 10 is only movable longitudinally, the movement of the pin 6' moves the terminal member 10 along the longitudinal axis, thereby moving the lens group for zooming.

The shift bar 4 is provided with a sealing means as it extends outwardly from the frame, such as a pair of O-rings engaged in circumferential grooves. The shaft 13 carrying the knob 1 can be sealed. Thus, the entire mechanism can be encased within the frame and outer cylinder with the exception of a portion. In this manner, the entire mechanism can be water-tightly sealed. In other words, because of the above structure, a water-proof mechanism can be obtained easily such that the leverage of the lever 7 and the stroke of the shift bar is sufficiently minimized with the packing inserted between the shift bar 4 and the frame.

In order to service the mechanism, an opening 3 can be provided in the frame and outer cylinder, which opening can be covered by cover 12 having packing 21.

The shift bar 4 is operationally fixed to the shift plate 2 by having the same fitted into a slot provided in the circumferential direction of the shift plate 2. This enables the shift plate 2 to be rotated freely relative to the half-portion of the outer cylinder in the frame. In this manner, the outer cylinders can be folded, centering around a center portion of the frame.

The longitudinal movement of the terminal member 10 for zooming moves a body tube 19 of the first shift lens group fixed by a screw 17 solely in the longitudinal direction. The screw 17 can be fitted in a slit cam in a cam cylinder 18 which can provide rotating movement of the cam cylinder 18. Another slit cam can be provided in the cam cylinder 18 with a screw 20 extending therethrough fixed to the body tube 19. This can enable the movement or shifting of a second shift lens group also capable of moving only in the longitudinal direction. Thus, one movement of the knob 1 can result in simultaneous movements of at least two shiftable lens groups.

It is readily apparent that the above-described shifting mechanism meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In a zoom lens system including at least one outer cylinder having a longitudinal axis, a frame connected to said cylinder, and a lens group in said cylinder which is movable along said axis, a mechanism for longitudinally shifting said lens group comprising:

a lever having opposite ends and being pivotally mounted in the frame between said ends, each end having a rotatable pin mounted thereon;

a terminal member mounted on said lens group having a groove therein extending perpendicularly to said axis, one pin of one end of said lever riding in the groove;

a shift bar mounted in said frame movable only in parallel with said axis and having opposite ends, one end of said bar having a groove therein extending perpendicularly to said axis, the other pin of said lever riding in the groove; and rotatable means in the frame for moving said shift bar longitudinally so that, upon such movement, the engagement of the pin in the groove of the bar pivots the lever so that the engagement of the other pin in the groove of the terminal members shifts the lens group longitudinally.

2. The mechanism of claim 1 wherein said rotatable means comprises a shaft rotatably mounted in said frame having screw threads thereon, a knob projecting from said frame engaged with one end of said shaft, and screw-thread means associated with said shaft and said shift bar for translating rotation of said knob into longitudinal movement of said shift bar.

3. The mechanism of one of claims 1 or 2 wherein the entire mechanism except for a portion of said rotatable means is water-tightly encased within said frame and said cylinder.

* * * * *